Nov. 23, 1971 — T. L. PAXTON — 3,621,809
PLANT MARKER
Filed July 17, 1970
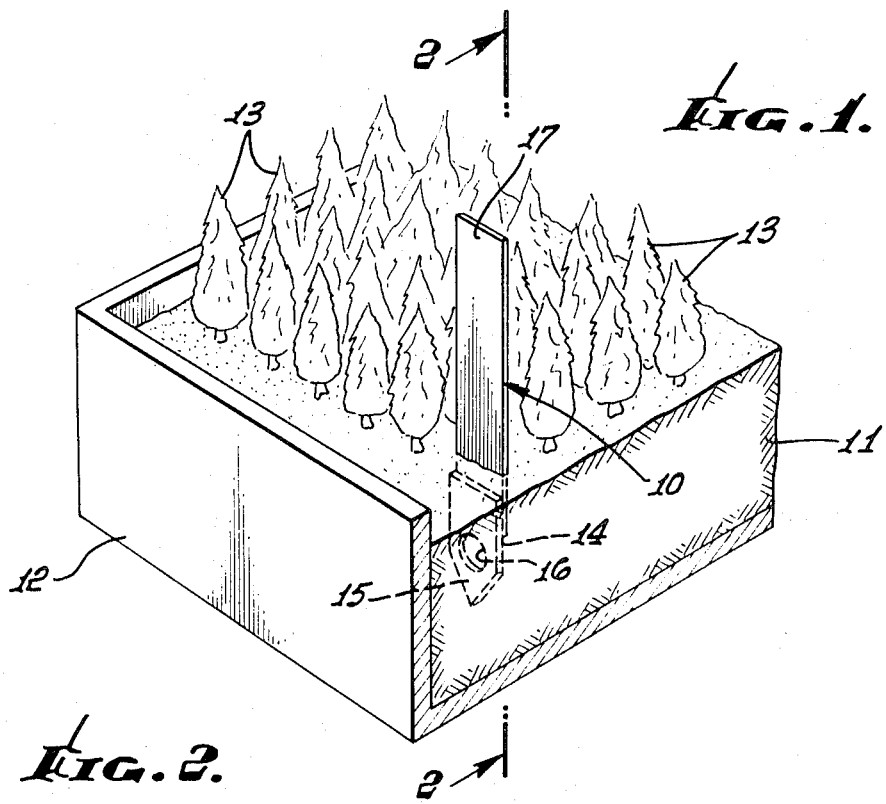
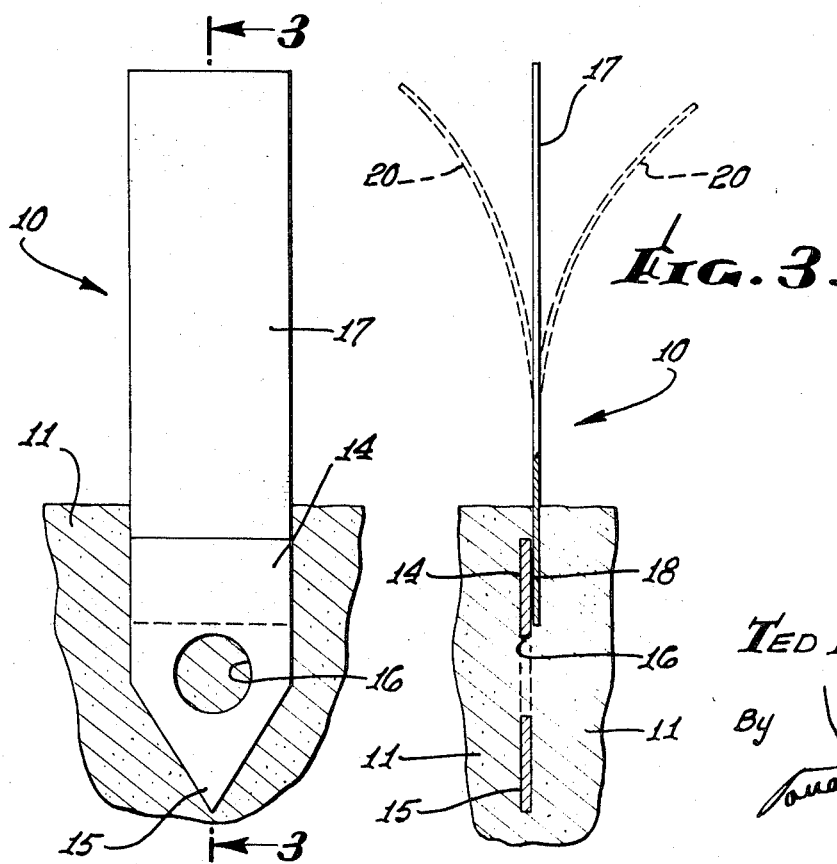
INVENTOR.
TED L. PAXTON
ATTORNEY.

United States Patent Office 3,621,809
Patented Nov. 23, 1971

3,621,809
PLANT MARKER
Ted L. Paxton, Riverside, Calif., assignor to
International Development Trust, Yakima, Wash.
Filed July 17, 1970, Ser. No. 55,774
Int. Cl. G01d 21/00
U.S. Cl. 116—114      2 Claims

ABSTRACT OF THE DISCLOSURE

A plant identifying marker stuck in the soil in nursery flats, trays and pots and transferred with the plants when brought and set out in the customer's garden. The marker has a stiff polystyrene anchor portion for readily penetrating the soil and being buried beneath the surface thereof and which is apertured to assist in resisting its removal, and a flexible plant identifying paper upper portion the lower end of which adheres to said anchor portion and which readily yields to pressure thereagainst whereby the buried lower portion remains anchored in the soil and loss of the marker is avoided.

SUMMARY OF THE INVENTION

Plant identifying markers most commonly used heretofore by nurseries are of two types. First, there is the paper strip slotted near one end and looped around the stem of a plant. The next most common marker is the wooden or plastic stake, a pointed end of which is pushed into the soil near the plant. While both are widely used by nurseries, complaints are heard of each of these markers as being too subject to inadvertent displacement and loss to be entirely satisfactory.

It is therefore a primary object of the present invention to provide a plant identifying marker for nursery and home use which includes a highly flexible visible strip attached at its lower end to a soil buried anchor and which will have a high capacity for resisting displacement when properly installed in the soil.

One of the causes of prior "stake" or "soil anchored" plant markers becoming lost is the uniform stiffness of the stake so that inadvertently brushing against the upper end of the same is likely to dislodge it from the soil.

Another object of the invention is therefore to make the marker of two different materials, a short buried lower anchor portion being of stiff polystyrene and the upper, major and visible portion, being made of waterproof but readily printable paper thick enough to remain erect but thin enough so that accidentally pressing against the paper upper portion of the marker will not disturb the buried polystyrene anchor portion thereof.

Fullfilling the last above mentioned object accomplishes two additional objects, to wit; cheapening the cost of the stake type marker and facilitating much better and cheaper printing job being done in providing advertising and plant identification data on the visible paper portion of the marker.

BRIEF DESCRIPTION OF THE DRAWINGS

FIG. 1 is a fragmentary diagrammatic perspective view of a nursery flat illustrating a preferred embodiment of the stake type plant marker of the present invention installed therein.

FIG. 2 is an enlarged vertical sectional front elevational view of the invention so installed taken on the line 2—2 of FIG. 1.

FIG. 3 is a vertical sectional view taken on the line 3—3 of FIG. 2.

DETAILED DESCRIPTION OF THE INVENTION

For illustrative purposes the invention, comprising a stake type plant identifying marker 10, as shown in FIG. 1, is there embedded in soil 11 confined in a nursery flat 12 for the growing of plants 13 for the nursery market and which are identified by said marker.

The marker 10 includes an earth anchored tip portion 14 which is formed of a relatively stiff sheet plastic material such as polystyrene and is preferably provided with a sharply pointed lower end 15 to assist it in penetrating the soil, and a relatively large hole 16 which assists in retaining said marker in place by the entrance of soil, roots, etc. into said hole. A major upper portion 17 of the marker 10 is made of a heavy paper or light cardboard which is selected for its capacity to normally remain erect while being sufficiently flexible that inadvertent engagement with the upper marker portion 17 will not tend to disturb the anchored position of the buried tip portion 14 of the marker.

This material is further selected with reference to its capacity for receiving ink so that the text of data for identifying plants and advertising the nursery may be brilliantly printed on one or both sides of the portion 17 of the marker. Finally, the material comprising this upper portion of the marker is also treated to render the same relatively immune to moisture so that it will remain erect notwithstanding its being subjected regularly to moisture by water sprayed on the plants 13. The upper marker portion 17 overlaps the earth anchor portion 14 and is united therewith by a thermo-plastic cement 18 or other type of adhesive material which is water insoluble.

The invention is illustrated in FIGS. 2 and 3 in full scale as preferably made for the nursery trade. The capacity of the upper portion 17 of the marker to remain erect when not pressurally deflected is shown by its full line position in FIG. 3. The readiness with which it yields when pressed to one side or the other is shown by broken lines 20.

While not limited strictly to these dimensions, the earth anchor tip portion 14 is preferably made of sheet polystyrene about one-thirty-second of an inch thick and the paper or cardboard used in the marker upper portion is preferably from .008" to .010" thick.

When pressing the stake anchor tips 14 into the soil the tip 14 is gripped just above the hole 16 so that the thumb and finger extend into the soil, and may be readily used to impact the soil therebeneath against the sides of the anchor tip 14, and also in the hole 16, thereby increasing the effectiveness of the anchor tip in resisting withdrawal.

I claim:

1. In a nursery plant identification marker, the combintion of:

a short earth anchor tip portion formed of a relatively stiff sheet plastic material such as polystyrene, said tip portion being adapted to be manually pressed vertically into the soil in a nursery tray deeply enough to be buried beneath the surface of said soil;

a long narrow and relatively flexible major upper portion formed of paper or light cardboard, the lower extremity of said upper marker portion overlapping said tip portion; and weather resisting adhesive means for uniting said lower extremity of said upper portion and the anchor tip portion in their overlapping area.

2. A stake-type nursery plant identification marker as recited in claim 1 wherein said earth anchor tip portion has a relatively large hole therein to assist in retaining said marker in place by the entrance of soil, roots, etc. into said hole; and wherein:

said earth anchor tip portion is pointed.

References Cited

UNITED STATES PATENTS

| | | | |
|---|---|---|---|
| 1,817,229 | 8/1931 | Borovicka | 40—10 C |
| 2,181,977 | 12/1939 | Magovern | 40—10 C |
| 2,292,272 | 8/1942 | Hirshfield | 40—2 |
| 2,625,760 | 1/1953 | Cleal | 40—10 C X |

FOREIGN PATENTS

| | | | |
|---|---|---|---|
| 20,870 | 1899 | Great Britain | 40—10 C |

LOUIS J. CAPOZI, Primary Examiner

U.S. Cl. X.R.

40—2